United States Patent
Banerjee et al.

(10) Patent No.: US 6,952,203 B2
(45) Date of Patent: Oct. 4, 2005

(54) TOUCHSCREEN USER INTERFACE: BLUETOOTH™ STYLUS FOR PERFORMING RIGHT MOUSE CLICKS

(75) Inventors: Dwip Banerjee, Austin, TX (US); Rabindranath Dutta, Austin, TX (US); Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 10/042,048

(22) Filed: Jan. 8, 2002

(65) Prior Publication Data

US 2003/0128195 A1 Jul. 10, 2003

(51) Int. Cl.[7] ................................................. G09G 5/00
(52) U.S. Cl. ......................... 345/179; 345/182; 178/18
(58) Field of Search .......................... 345/179, 173, 345/177, 169, 180; 178/18, 19.04, 87; 401/195

(56) References Cited

U.S. PATENT DOCUMENTS

| | | | | |
|---|---|---|---|---|
| 5,247,137 A | * | 9/1993 | Epperson ................ | 178/19.04 |
| 5,294,792 A | * | 3/1994 | Lewis et al. ............. | 250/221 |
| 5,434,371 A | * | 7/1995 | Brooks .................... | 178/19.04 |
| 6,134,711 A | * | 10/2000 | Nakamura et al. ......... | 717/169 |
| 6,422,775 B1 | * | 7/2002 | Bramlett et al. .......... | 401/195 |
| 6,434,403 B1 | * | 8/2002 | Ausems et al. ........... | 455/556.2 |
| 6,487,597 B1 | * | 11/2002 | Horie et al. .............. | 709/227 |
| 6,536,972 B2 | * | 3/2003 | Bramlett et al. .......... | 401/16 |
| 6,661,409 B2 | * | 12/2003 | Demartines et al. ....... | 345/173 |
| 6,670,951 B2 | * | 12/2003 | Clough et al. ............ | 345/173 |
| 2003/0107607 A1 | * | 6/2003 | Nguyen ................... | 345/863 |

* cited by examiner

*Primary Examiner*—Guy Lamarre
*Assistant Examiner*—Fritz Alphonse
(74) *Attorney, Agent, or Firm*—Duke W. Yee; Marilyn Smith Dawkins; Betty Formby

(57) ABSTRACT

A method, program and system for enabling alternate input commands by means of a stylus associated with a personal digital assistant (PDA) are provided. The method comprises applying pressure to a pressure sensor on the stylus, which invokes an application on the PDA that interprets stylus input as equivalent to a right mouse click on a computer. In response to the stylus being touched to an object displayed by the PDA, the application opens a menu associated with that object, wherein the menu allows a user to initiate specified object functions and to change specified properties of the object. Invoking the application on the PDA is accomplished via a Bluetooth™ signal between the stylus and PDA.

15 Claims, 5 Drawing Sheets

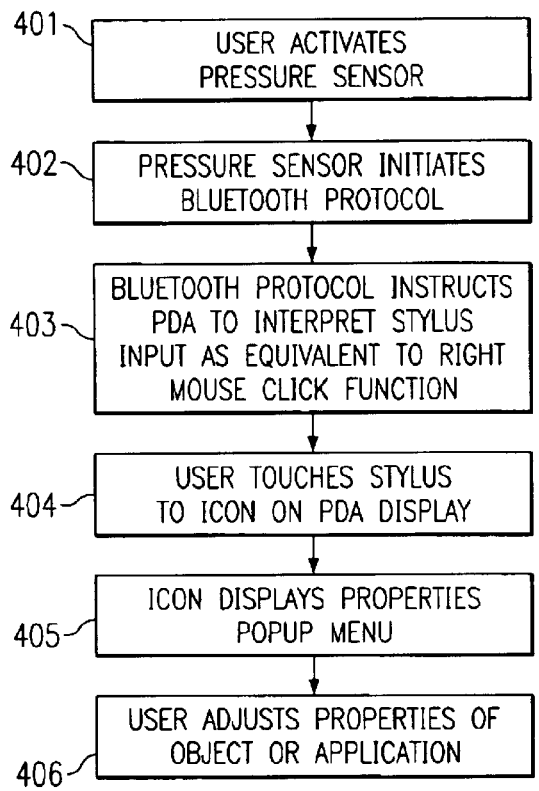
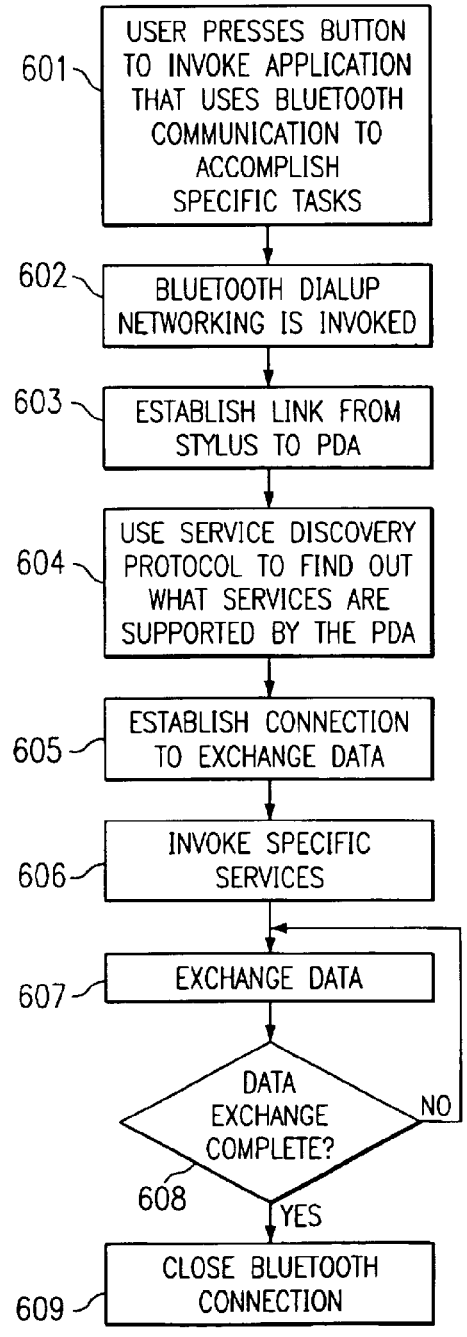
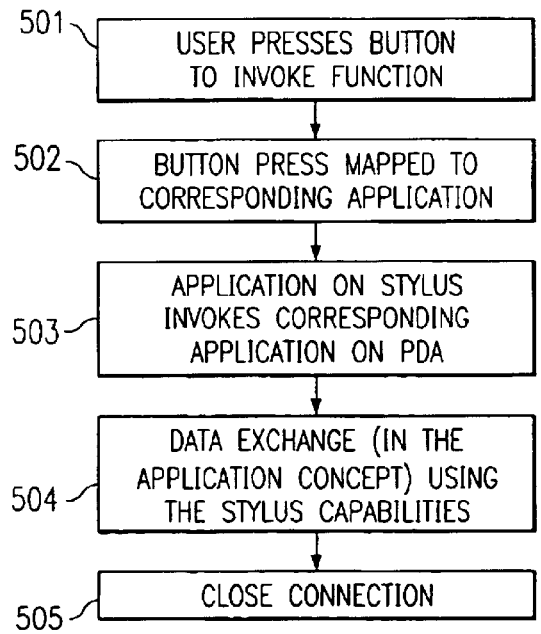

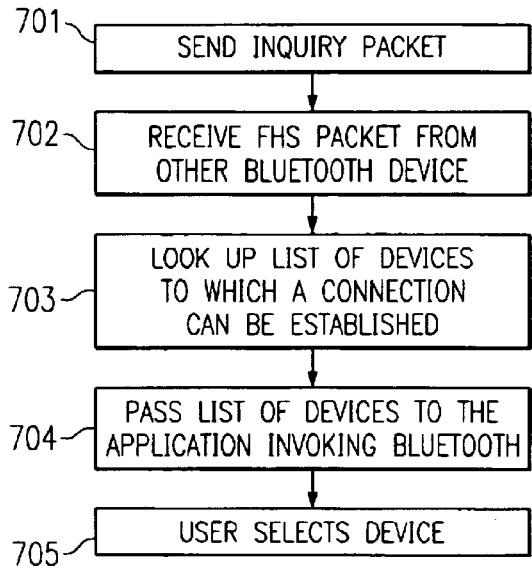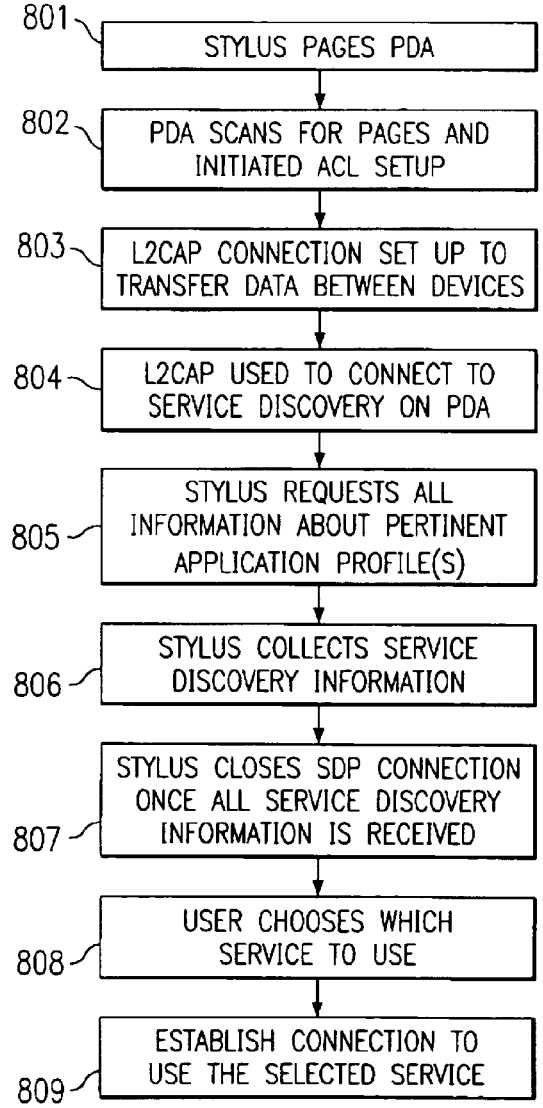

TOUCHSCREEN USER INTERFACE: BLUETOOTH™ STYLUS FOR PERFORMING RIGHT MOUSE CLICKS

BACKGROUND OF THE INVENTION

1. Technical Field

The present invention relates generally to portable computing devices and more specifically to data input.

2. Description of Related Art

Personal Digital Assistants (PDAs) often rely on a stylus to allow the user to select objects and icons displayed on the PDA touchscreen. In traditional desktop and laptop computers employing a mouse or mouse equivalent (for laptops), selection of icons and objects may be performed with either type of mouse click. Traditionally, a left mouse click opens or initiates an underlying object or application represented by an icon. Right mouse clicks are used to display property menus associated with an icon, which allow the user to make adjustments to the function of the applications in question.

Current stylus-based systems of writing on touchscreens use the stylus as the equivalent of a single-click mouse (usually equivalent to a traditional left mouse click). However, many applications are better if designed to accommodate two mouse click functions (i.e. left and right click).

Therefore, it would be desirable to have a method for enabling the equivalent of two mouse click functions with a single writing stylus.

SUMMARY OF THE INVENTION

The present invention provides a method, program and system for enabling alternate input commands by means of a stylus associated with a personal digital assistant (PDA). The method comprises applying pressure to a pressure sensor on the stylus, which invokes an application on the PDA that interprets stylus input as equivalent to a right mouse click on a computer. In response to the stylus being touched to an object displayed by the PDA, the application opens a menu associated with that object, wherein the menu allows a user to initiate specified object functions and to change specified properties of the object. Invoking the application on the PDA is accomplished via a Bluetooth™ signal between the stylus and PDA.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a flowchart illustrating the process of simulating a mouse right click with a stylus in accordance with the present invention;

FIG. 5 depicts a flowchart illustrating the general algorithm for invoking the Bluetooth to carry out the desired function in accordance with the present invention;

FIG. 6 depicts a flowchart illustrating the process of Bluetooth service discovery during connection setup in accordance with the present invention;

FIG. 7 depicts a flowchart illustrating the process of establishing a link to other Bluetooth devices in accordance with the present invention;

FIG. 8 depicts a diagram illustrating the process of determining what services are supported by a Bluetooth device in accordance with the present invention.

DETAILED DESCRIPTION OF THE PREFERRED EMBODIMENT

Figure 1:
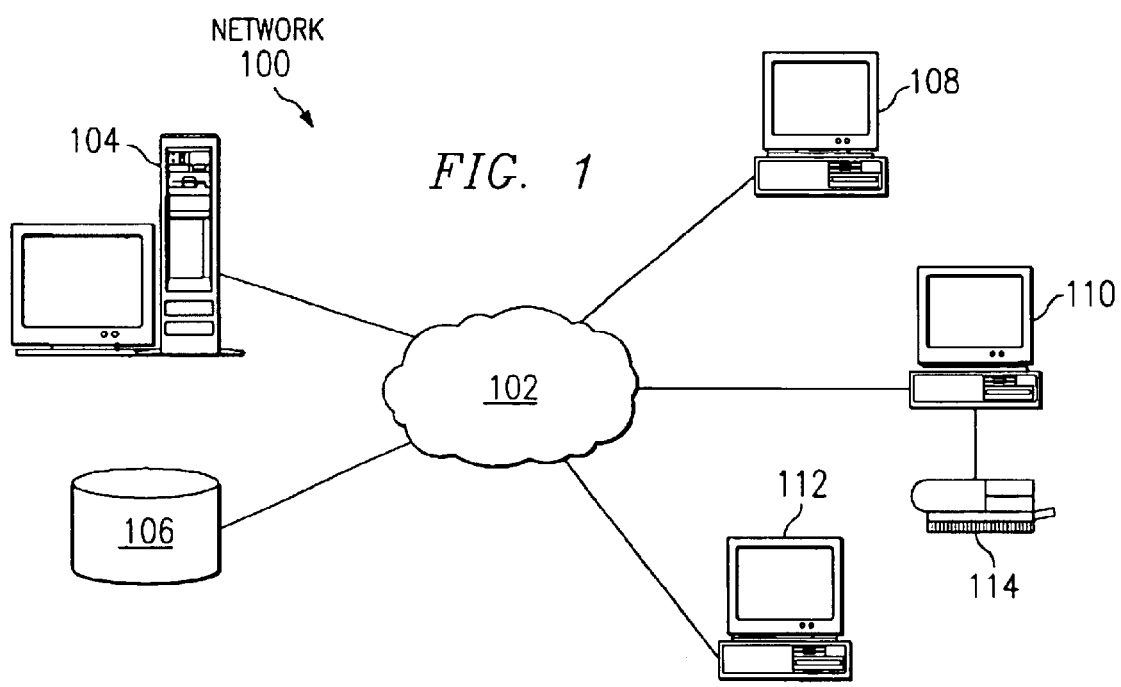
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2A:
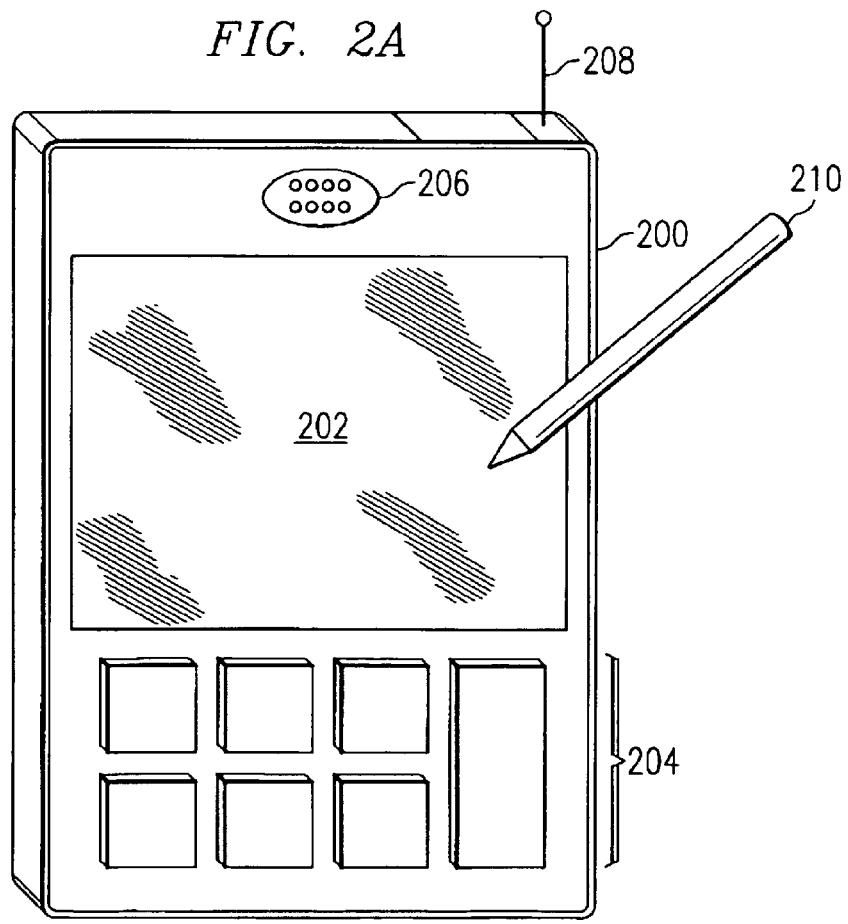
FIG. 2A depicts a diagram of a client in the form of a personal digital assistant (PDA) in accordance with a preferred embodiment of the present invention.

With reference now to FIG. 2A, a diagram of a client in the form of a personal digital assistant (PDA) is depicted in accordance with a preferred embodiment of the present invention. PDA 200 includes a display 202 for presenting textual and graphical information. Display 202 may be a known display device, such as a liquid crystal display (LCD) device. The display may be used to present a map or directions, calendar information, a telephone directory, or an electronic mail message. In these examples, screen 202 may receive user input using an input device such as, for example, stylus 210. The present invention relates specifically to improving and expanding input options via stylus, such as stylus 210.

PDA 200 may also include keypad 204, speaker 206, and antenna 208. Keypad 204 may be used to receive user input in addition to using screen 202. Speaker 206 provides a mechanism for audio output, such as presentation of an audio file. Antenna 208 provides a mechanism used in establishing a wireless communications link between PDA 200 and a network, such as network 100 in FIG. 1.

PDA 200 also preferably includes a graphical user interface that may be implemented by means of systems software residing in computer readable media in operation within PDA 200.

Figure 2B:
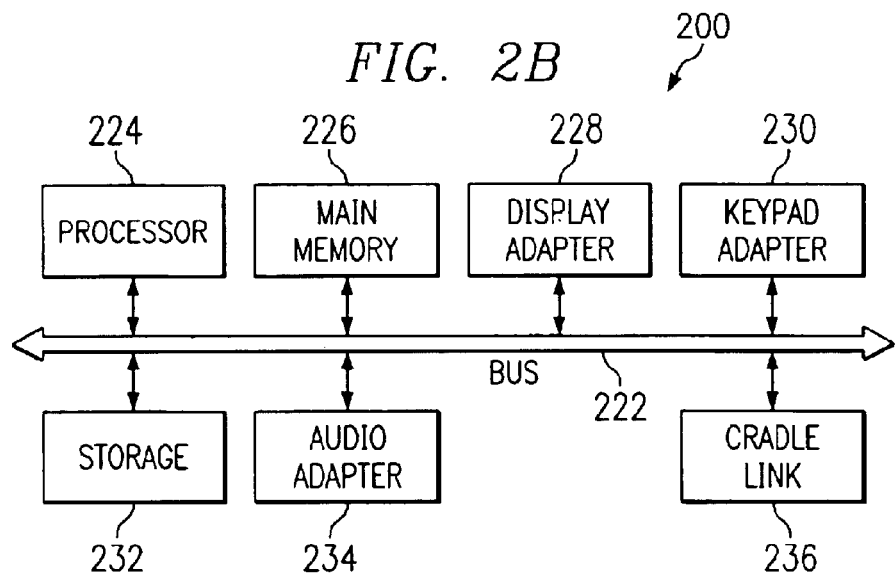
FIG. 2B depicts a block diagram illustrating the hardware configuration of a PDA in accordance with a preferred embodiment of the present invention.

Turning now to FIG. 2B, a block diagram illustrating the hardware configuration of PDA 200 is shown in accordance with a preferred embodiment of the present invention. PDA 200 is an example of a PDA in which code or instructions implementing the processes of the present invention may be located. PDA 200 includes a bus 222 to which processor 224 and main memory 226 are connected. Display adapter 228, keypad adapter 230, storage 232, and audio adapter 234 also are connected to bus 222. Cradle link 236 provides a mechanism to connect PDA 200 to a cradle used in synchronizing data in PDA 200 with another data processing system. Further, display adapter 228 also includes a mechanism to receive user input from a stylus when a touch screen display is employed.

An operating system runs on processor 224 and is used to coordinate and provide control of various components within PDA 200 in FIG. 2B. The operating system may be, for example, a commercially available operating system such as Windows CE, which is available from Microsoft Corporation. Instructions for the operating system and applications or programs are located on storage devices, such as storage 232, and may be loaded into main memory 226 for execution by processor 224.

Those of ordinary skill in the art will appreciate that the hardware in FIG. 2B may vary depending on the implementation. Other internal hardware or peripheral devices, such as flash ROM (or equivalent nonvolatile memory) or optical disk drives and the like, may be used in addition to or in place of the hardware depicted in FIG. 2B.

With current stylus-based systems for writing on touchscreens, as in PalmOS or PocketPC, the stylus acts essentially as a single-click mouse with one button. However, many applications are better designed with two mouse clicks (i.e. left and right clicking). The present invention addresses the problem of how to arrange for two mouse click functions (the equivalent of left and right clicking) with a single stylus, such as stylus 210 in FIG. 2. This is accomplished by means of Bluetooth technology.

Bluetooth is a wireless personal area network (PAN) technology. It is an open protocol for short-range transmission of digital data between mobile devices (e.g. PDA and mobile phones) and desktop devices. Bluetooth-enabled mobile devices can communicate among themselves without cables. Bluetooth supports both point-to-point and multi-point applications. Bluetooth can provide up to 720 Kbps of data transfer within 10 meters (and up to 100 meter with a power boost). Bluetooth does not require line of sight, but instead uses omnidirectional radio waves, and employs a frequency hopping spread spectrum technique that changes the signal 1600 times per second. In case of interference from other devices, transmission speed is downgraded, but the transmission does not stop. New chips and cards for laptop computers, as well as new PDAs, are being equipped with Bluetooth technology for communication with LANs, cell phones, and other network technologies.

Figure 3:
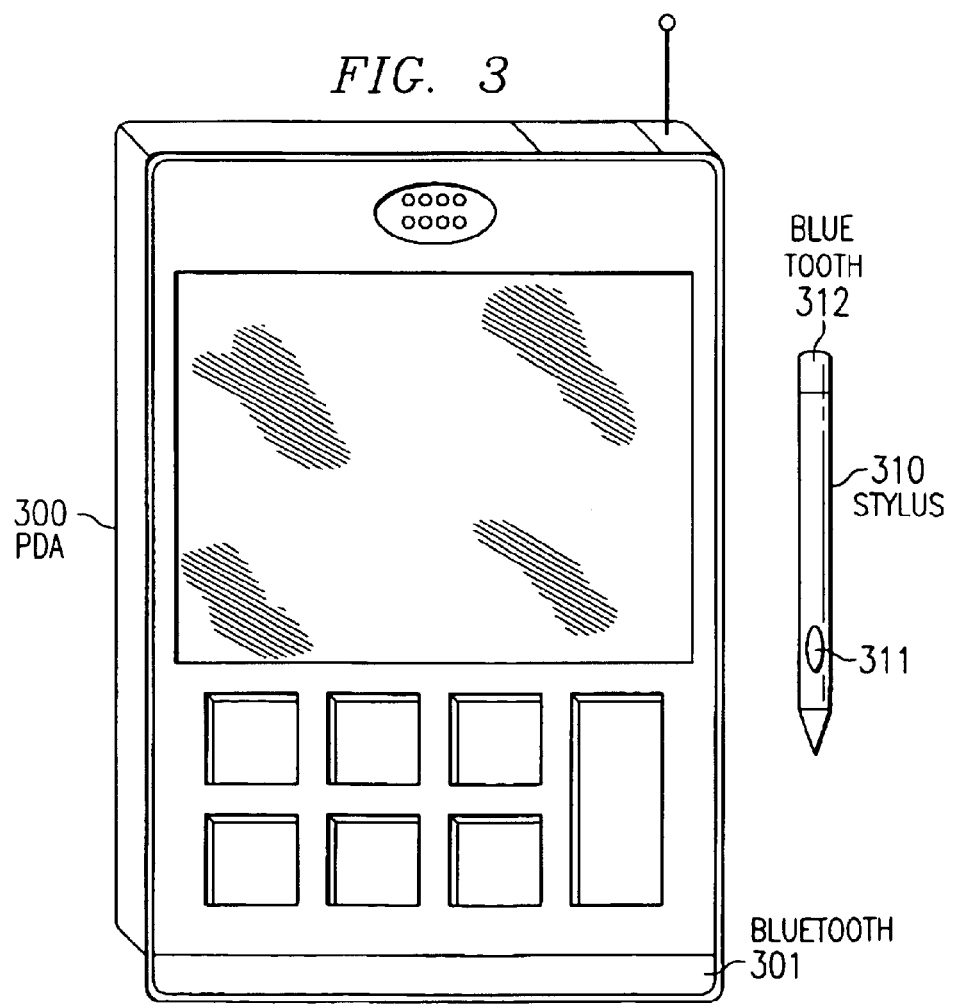
FIG. 3 depicts a schematic diagram illustrating the incorporation of Bluetooth technology into a PDA/stylus design in accordance with the present invention.

Referring to FIG. 3, a schematic diagram illustrating the incorporation of Bluetooth technology into a PDA/stylus design is depicted in accordance with the present invention. PDA 300 and stylus 310 both incorporate Bluetooth elements 301 and 312 respectively. These Bluetooth elements 301 and 312 facilitate the special features of the present invention. A pressure sensor 311 on stylus 310 activates the Bluetooth-based communication and makes the PDA 300 regard the traditional stylus click as equivalent to a right mouse click.

Alternatively, the user may press down on the pressure sensor 311, without releasing pressure, to indicate an alternate state to the stylus action. For example, if the user presses with the stylus on an icon, the application or object represented by the icon will open normally (i.e. equivalent to left click function on a mouse). On the other hand, if the user presses on the pressure sensor before pressing the stylus on the icon, the icon/object will display a properties page that allows the user to set or adjust certain properties for that icon object or application.

In yet another embodiment, the user may simulate a right click function by pressing on the pressure sensor of the stylus and, without releasing the pressure, touching the stylus to the icon. This action will result in the display of a popup menu with action options that may be performed on or by the object.

If the user presses the pressure sensor and then, without releasing, touches the stylus to the pad and draws a circle around a plurality of icons or objects, the resulting display will be a popup menu with action items that may be performed on or by all of the grouped icons.

Referring to FIG. 4, a flowchart illustrating the process of simulating a mouse right click with a stylus is depicted in accordance with the present invention. The flowchart in FIG. 4 is an overview that encompasses all of the variants described above. The process is begun when the user activates the pressure sensor in the stylus (step 401). As described above, the user may activate the pressure sensor by pressing and then releasing it or by maintaining pressure throughout the desired function. Activation of the pressure sensor initiates the Bluetooth communication protocol (step 402). The Bluetooth protocol then instructs the PDA to interpret subsequent stylus input as equivalent to a mouse right click (i.e. a request to display a properties/functions menu)(step 403). The user touches the stylus to an icon on the PDA display (step 404) and the icon displays a popup properties menu (step 405). From there, the user may make adjustments to the underlying object/ application, just as a user may do when using a mouse with a PC (step 406).

Referring now to FIG. 5, a flowchart illustrating the general algorithm for invoking the Bluetooth to carry out the desired function is depicted in accordance with the present invention. The user presses the button (pressure sensor) to invoke the desired function (i.e. right click) (step 501). The button press is mapped to a corresponding application on the stylus (step 502). This application then invokes the corresponding application on the PDA by using the Bluetooth module for communication between the stylus and the PDA (step 503). The necessary data is exchanged, within the application context, using the stylus Bluetooth capabilities (step 504). When the data exchange is finished, the communication connection is closed (step 505).

Referring to FIG. 6, a flowchart illustrating the process of Bluetooth service discovery and data exchange during connection setup is depicted in accordance with the present invention. After the user activates the pressure sensor to invoke the application using Bluetooth (step 601), Bluetooth dialup networking is invoked (step 602). A link is established between the stylus and PDA (step 603), and the stylus uses Service Discovery Protocol (SDP) to find out what services are supported by the PDA (step 604). SDP allows the stylus to be used with multiple devices and multiple services. Once the stylus knows which services are supported by the PDA, a connection is established between the stylus and PDA (step 605) and specific services are invoked (step 606). In the present example, the specific services in question are those associated with a mouse right click, as explained above.

Examples of other specific services which may be accessed with the present invention include calling up a calendar or e-mail by double clicking the pressure sensor or by means of another pressure sensor(s) on the stylus. E-mail messages or annotations to the calendar may then be hand written using the stylus.

Data related to the specific service is exchanged (step 607), and the processes is continually monitored to determine if the data exchange is complete (step 608). If the exchange is not yet complete, the process continues. Once the data exchange is complete, the Bluetooth connection is closed (step 609).

Referring to FIG. 7, a flowchart illustrating the process of establishing a link to other Bluetooth devices is depicted in accordance with the present invention. An inquiry packet is sent from the stylus to the PDA (step 701). The PDA returns a Frequency Hop Synchronization (FHS) packet (step 702). The FHS packet contains the necessary information to establish a connection between the two devices.

The stylus then looks up a list of Bluetooth devices to which it can connect (step 703), and passes this list to the application which invoked Bluetooth (step 704). Naturally, in the present example the PDA will be on the list of compatible devices. However, as mentioned above, the stylus may also be used with other devices and services.

The user then selects the device (i.e. PDA) to which a connection is desired (step 705). Within the context of the present example (right clicking), the last step of selecting the device (PDA) can be performed automatically by the application.

Referring to FIG. 8, a diagram illustrating the process of determining what services are supported by a Bluetooth device is depicted in accordance with the present invention. The stylus pages the PDA using information gathered during the inquiry (described above) (step 801). The PDA scans for and responds to the pages from the stylus and initiates an Asynchronous ConnectionLess (ACL) link setup (step 802). A logical link control and adaptation protocol (L2CAP) connection is set up to transfer data between the stylus and PDA (step 803). The L2CAP connection is used to access the service discovery function on the PDA (step 804). The stylus then requests all information about the pertinent application profile(s)(step 805), and collects the service discovery information (step 806). Optionally, the stylus may close the SDP connection once all of the service discovery information is received (step 807). The user then chooses the desired service (step 808). As described above, the step of choosing the service may be performed automatically. Once the service is selected, a connection is established to use that service (step 809).

Figure 9:
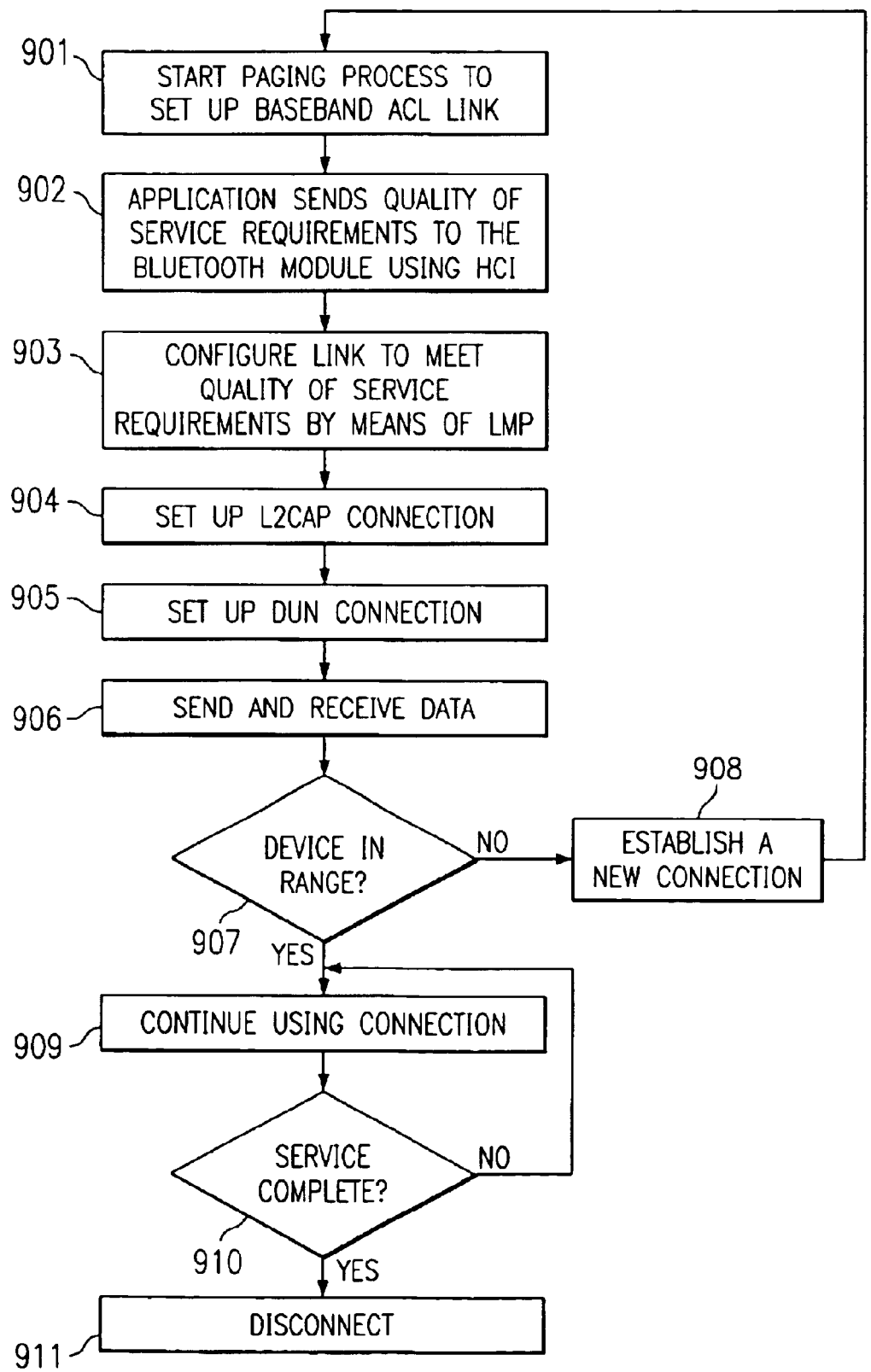
FIG. 9 depicts a flowchart illustrating the process of establishing a Bluetooth connection to a service in accordance with the present invention.

Referring to FIG. 9, a flowchart illustrating the process of establishing a Bluetooth connection to a service is depicted in accordance with the present invention. The stylus starts the paging process to set up a baseband ACL link with the PDA (step 901). If the there are quality-of-service requirements, the application sends these requirements to the Bluetooth module by means of a Host Controller Interface (HCI) (step 902). The Bluetooth module's link manager then configures the link to meet the requirements by means of Link Manager Protocol (step 903).

After the ACL connection is set up, a L2CAP connection is set up (step 904). Radio Frequency Communication (RFCOMM) is used for the L2CAP connection if dialup networking is used. The Dialup Networking (DUN) connection is then established (step 905).

Data is sent and received over the connection (step 906), while the stylus continues to monitor the range of the PDA (step 907). If the PDA moves out of range, a new connection is established (step 908), and the process returns to the beginning. If the PDA remains in range, the stylus continues to use the same connection (step 909), while monitoring the connection to determine if the service is complete (step 910). Once the service is complete, the connection is ended (step 911).

The present invention solves the problem of providing additional functionality to the pervasive computing/PDA technology interface by permitting a stylus to emulate functions previously available only with a mouse input device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enabling alternate input commands by means of a stylus associated with a personal digital assistant (PDA), the method comprising:

detecting activation of a pressure sensor on the stylus; and in response to the activation of the pressure sensor, invoking an application on the PDA, and establishing a two-way link with said PDA, using service discovery protocol to determine services supported by said PDA, wherein the application, in response to the stylus touching an object displayed by the PDA, opens a menu associated with that object, wherein the menu allows a user to initiate specified object functions and to change specified object properties;

in response to the stylus drawing a perimeter around a plurality of objects displayed by the PDA, opening a menu of object functions and object properties associated with all objects in the perimeter.

2. The method according to claim 1, wherein the step of invoking the application on the PDA is accomplished by means of a BlueTooth™ signal between the stylus and the PDA.

3. A method for enabling input commands to a personal digital assistant (PDA), the method comprising:

detecting activation of a pressure sensor on a stylus; and in response to the activation of said pressure sensor, establishing a two-way link with said PDA, using service discovery protocol to determine services supported by said PDA; and invoking an application on said PDA, wherein said application opens at least one of the following function on the PDA:

e-mail, wherein e-mail messages can be band written by means of said stylus; and calendar, wherein annotations to said calendar may be hand written by means said stylus.

4. The method according to claim 3, wherein the step of invoking the application on the PDA is accomplished by means of a BlueTooth™ signal between the stylus and the PDA.

5. A method for enabling input commands to a personal digital assistant (PDA), the method comprising:

detecting activation of a pressure sensor on a wireless-enabled stylus; and in response to the activation of said pressure sensor, invoking an application to establish a two-way link with said PDA;

using service discovery protocol to determine services supported by said PDA; and invoking one of said services supported by said PDA.

6. A computer program product in a computer readable medium for use in a data processing system, for enabling alternate input commands by means of a stylus associated with a personal digital assistant (PDA), the computer program product comprising:

instructions for detecting activation of a pressure sensor on the stylus; and instructions for invoking an application on the PDA in response to the activation of the pressure sensor and establishing a two-way link with said PDA, using service discovery protocol to determine services supported by said PDA, wherein the application, in response to the stylus touching an object displayed by the PDA, opens a menu associated with that object, wherein the menu allows a user to initiate specified object functions and to change specified object properties;

instructions for opening a menu of object functions and object properties associated with a plurality of objects displayed by the PDA, in response to the stylus drawing a perimeter around said plurality of objects.

7. The computer program product according to claim 6, wherein the instructions for invoking the application on the PDA are executed in BlueTooth™.

8. A computer program product in a computer readable medium for use in a data processing system, for enabling input commands to a personal digital assistant (PDA), the computer program product comprising:

instructions for detecting activation of a pressure sensor on a stylus; and instructions for establishing a two-way link with said PDA, using service discovery protocol to determine services supported by said PDA; and invoking an application on said PDA in response to the activation of said pressure sensor, wherein said application opens at least one of the following function on said PDA:

e-mail, wherein e-mail messages can be hand written by means of the stylus; and calendar, wherein annotations to the calendar may be hand written by means the stylus.

9. The computer program product according to claim 8, wherein the instructions for invoking the application on the PDA are executed in BlueTooth™.

10. A computer program product in a computer readable medium for use in a data processing system, for enabling input commands to a personal digital assistant (PDA), the computer program product comprising:

instructions for detecting activation of a pressure sensor on a BlueTooth™-enabled stylus;

instructions for establishing a two-way link to said PDA, via BlueTooth™ in response to the activation of the pressure sensor;

instructions for using service discovery protocol to determine services supported by said PDA; and instructions for invoking one of said services supported by said PDA.

11. A system for enabling alternate input commands to a personal digital assistant (PDA), the system comprising:

a pressure sensor on a stylus;

a module on said stylus for establishing a two-way link with said PDA in response to activation of the pressure sensor; and instructions on said PDA for opening a menu in response to said stylus drawing a perimeter around a plurality of objects displayed by the PDA, wherein said menu contains object functions and object properties associated with said plurality of objects.

12. The system according to claim 11, wherein said module for establishing a two-way link with said PDA is a BlueTooth™ module.

13. A system for enabling input commands to a personal digital assistant (PDA), the system comprising:

a pressure sensor on a stylus; and a module on said stylus which invokes an application on said PDA and establishes a two-way link with said PDA, using service discovery protocol to determine services supported by said PDA in response to activation of said pressure sensor, wherein said application opens at least one of the following function on said PDA:

e-mail, wherein e-mail messages can be hand written by means of said stylus; and calendar, wherein annotations to said calendar may be hand written by means said stylus.

14. The system according to claim 13, wherein said module that invokes said application on said PDA is a BlueTooth™ module.

15. A system for enabling input commands to a personal digital assistant (PDA), the system comprising:

a pressure sensor on a BlueTooth™-enabled stylus; and a BlueTooth™ module on said stylus for establishing a two-way link with a BlueTooth™ module on said PDA in response to activation of said pressure sensor;

instructions in memory on said stylus for using service discovery protocol to determine services supported by said PDA; and instructions in memory on said stylus for invoking one of said services supported by said PDA.

* * * * *

UNITED STATES PATENT AND TRADEMARK OFFICE
CERTIFICATE OF CORRECTION

PATENT NO. : 6,952,203 B2  Page 1 of 1
DATED : October 4, 2005
INVENTOR(S) : Banerjee et al.

It is certified that error appears in the above-identified patent and that said Letters Patent is hereby corrected as shown below:

<u>Column 7,</u>
Line 23, after "can be" delete "band" and insert -- hand --.

Signed and Sealed this

Sixth Day of June, 2006

JON W. DUDAS
*Director of the United States Patent and Trademark Office*